Oct. 11, 1927. 1,645,137
R. G. GRISWOLD
ART OF GAS DISTRIBUTION
Filed Aug. 2, 1923
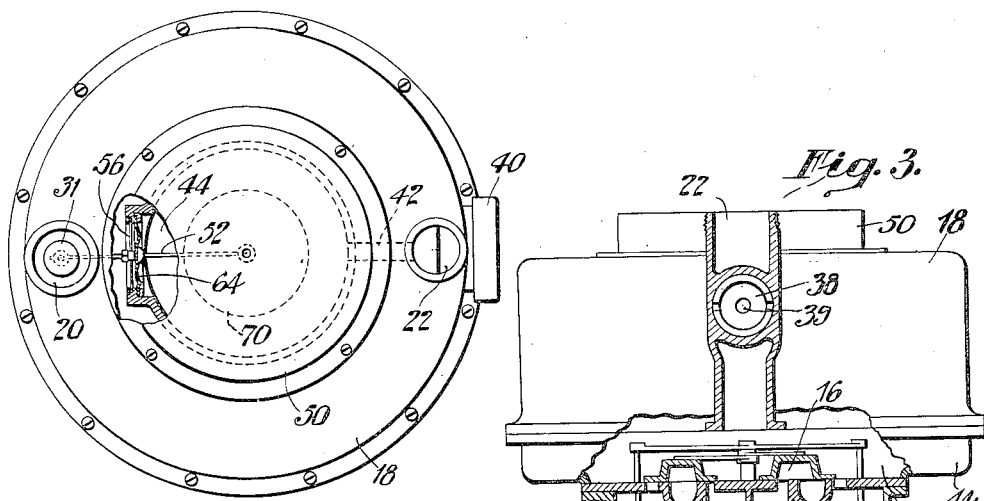
Fig. 1.
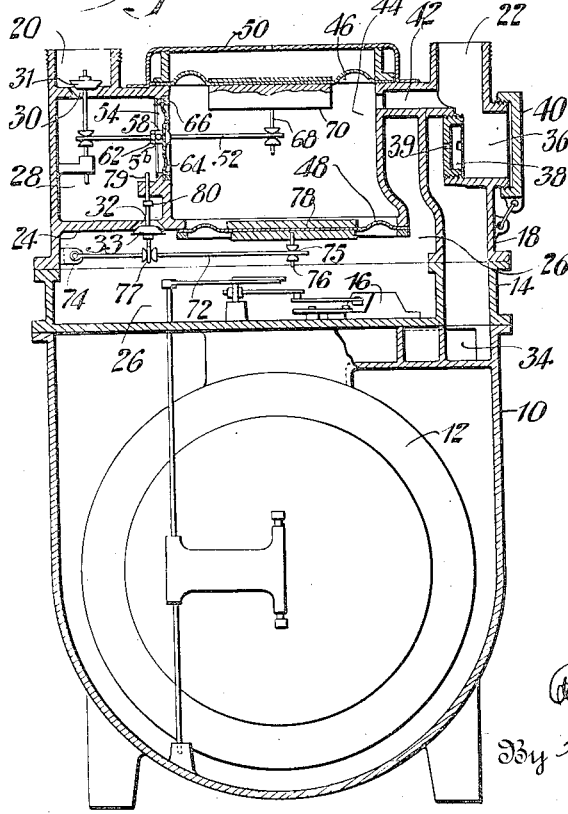
Fig. 2.
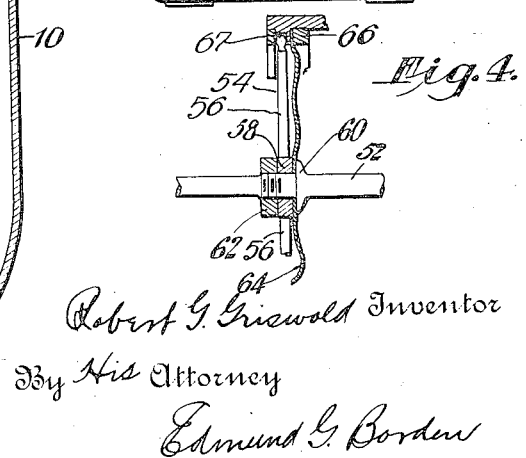
Fig. 3.
Fig. 4.
Robert G. Griswold Inventor
By His Attorney
Edmund G. Borden Patented Oct. 11, 1927.

1,645,137

UNITED STATES PATENT OFFICE.

ROBERT G. GRISWOLD, OF WESTFIELD, NEW JERSEY, ASSIGNOR TO DOHERTY RESEARCH COMPANY, OF NEW YORK, N. Y., A CORPORATION OF DELAWARE.

ART OF GAS DISTRIBUTION.

Application filed August 2, 1923. Serial No. 655,152.

My invention relates to the art of gas distribution. It has been known to supply gas to consumers at relatively high pressures and to use a demand limiting meter and a pressure regulator in series with each of the ordinary dry volumetric consumer's meters. Two arrangements of the three pieces of apparatus have been used. In one the gas flows first through the volumetric meter, then through the demand limiting device and then through the pressure regulator before going to the consumer's burners. In other arrangement, the gas flows first through the pressure regulator, then through the demand limiting device, then through the volumetric meter and then to the consumer. Each of these arrangements has operating drawbacks in addition to the expense of installation and upkeep. In the case of the first mentioned arrangement, the consumer is favored to an impractical extent in that the gas is measured at full line pressure. As the dry meters are required by law in many places to be calibrated at a given low pressure, while the line pressure at which the gas is supplied and metered is much higher, a material error results in the consumer's favor. However, the first arrangement produces the desirable result that pressure on the consumer's burners is substantially constant whether the minimum amount or the full amount permitted by the demand limiting meter is being used.

In the case of the arrangement in which the dry meter follows the other devices, operating conditions are better in some respects than those in the case of the first mentioned arrangement, but poorer in other respects and ideal in none. Where the dry meter follows, the gas is metered to the consumer at sufficient pressure above that at which the meter is calibrated to cause an appreciable error, while the pressure on the consumer's burners varies materially when the flow varies from the minimum to the demand limit. The arrangement in which the dry meter is last has, however, displaced the first described arrangement because of the importance of correct metering.

It is one of the objects of my invention to provide an apparatus combining the functions of all three of the pieces of apparatus mentioned and which shall improve the conditions of domestic gas supply as to the pressures occurring under varying conditions of flow both at the dry meters, and at the burners.

A difficulty has existed also in the demand limiting meters used in the distribution of artificial gas which carries a sticky resin or tar. This sticky material often causes the demand limiting valves to stick to their seats, putting the consumer's burners out of use for a time and causing great inconvenience.

Another object of my invention is to provide a demand limiting device which shall be incapable of sticking.

The novel features of my invention are pointed out with particularity in the appended claims.

The details of a suitable embodiment of my invention, together with its method of operation and other objects and advantages thereof, will be understood from the following description taken with the accompanying drawing in which Fig. 1 is a plan view, partly broken away of an apparatus according to my invention;

Fig. 2 is a vertical sectional view; parts being broken away, of the apparatus illustrated in Fig. 1;

Fig. 3 is a vertical sectional view, parts being broken away, Fig. 3 being taken at right angles to Fig. 2;

Fig. 4 is a detail of one of the valve operating connections illustrated in Figs. 1 and 2.

In the drawing, 10 is a casing of any convenient construction which is provided with a dry volumetric metering mechanism 12. The volumetric metering mechanism 12 may be of any convenient or ordinary construction and that illustrated in the drawing is of the well known bellows type. Above the casing 10 is a casting 14 in which the valve mechanism 16 of the meter 12 is mounted. Above the casting 14 is another casting 18 having a gas inlet 20 and gas outlet 22. The casting 18 has a web 24 on its lower side shutting off the valve chamber 26 in the casting 14 from a chamber 28 in one side of casting 18. Casting 18 is provided also with two valve seats 30 and 32 through which the gas passes in its course to the volumetric mechanism 12. Valve seat 30 and its cooperating valve 31 control the passage of gas from the inlet 20 to the chamber 28 and valve seat 32 with its cooperative valve 33 control the passage of gas from the chamber 28 to the valve chamber 26.

The valve mechanism 16 controls the passage of gas from the chamber 26 to the volumetric mechanism 12 and thence to an outlet passage 34 in casing 10. The passage 34 is continued upwardly through castings 14 and 18 to a chamber 36 in direct communication with the outlet 22. An orifice disc 38 is positioned between the upper end of passage 34 and the chamber 36. The orifice disc 38 has an orifice 39 therein selected with reference to the maximum flow or demand limit which the apparatus is intended to permit. Opposite the disc 38 there is a readily removable cap 40 forming one side of the chamber 36 and giving ready access to the disc 38 in case it is desired to remove the disc to substitute one having a different sized orifice to change the demand limit.

Above the chamber 36 a passage 42 is provided leading off from the outlet 22 into a chamber 44 in the casting 18, the top of chamber 44 being formed by a diaphragm 46 and the bottom of chamber 44 being formed by a diaphragm 48. The upper surface of diaphragm 46 is exposed to full atmospheric pressure which enters freely through a cap 50. The lower surface of diaphragm 46 as well as the upper surface of diaphragm 48 are obviously exposed to the gas pressure in outlet 22, this being admitted to the chamber 44 through conduit 42. The lower surface of diaphragm 48, however, is exposed to the pressure of gas in chamber 26, this chamber containing valve mechanism 16. Operating connections are provided between diaphragm 46 and valve 31 and diaphragm 48 and valve 33 respectively. Preferably the connections between diaphragm 46 and valve 31 pass through the wall of chamber 44 and I have illustrated an arrangement for this purpose comprising a lever 52 passing through an aperture 54 in the wall of the chamber 44 and pivoted on gudgeons 56, on a ring 58 carried on lever 52. The ring 58 is held in place on the lever 52, being clamped between a boss 60 formed on the lever 52 and a nut 62 threaded onto the same. The aperture 54 in the wall of chamber 44 is closed against the passage of gas by means of a small annular diaphragm 64, one edge of which is clamped between the ring 58 and the boss 60, and the outer edge of which is fastened against the wall of chamber 44 by means of an annular plate or ring 66. The gudgeons 56 are journalled in recesses, 67, Fig. 4, cut into the sides of the aperture 54. At one end, the lever 52 is pivotally connected to a link 68 fixed to a weight 70 carried on the diaphragm 46. The other end of lever 52 is pivotally connected to the stem of valve 31. The operating connections between diaphragm 48 and valve 33 comprise a lever 72 pivoted at 74 and pivotally connected at 75 to a rod 76 fixed to a plate 78 carried by the diaphragm 48. At 77 the lever 72 is pivotally connected to the stem of valve 33. The weight 70 fixed to diaphragm 46 is so chosen that when the pressure in outlet 22 rises above that desired, usually 3 inches of water, the weight and diaphragm 46 are lifted against atmospheric pressure closing valve 31 somewhat and cutting down the flow of gas. On the other hand, if the gas pressure in 22 falls below that desired, the weight 70 overcomes the pressure of gas against the diaphragm 46 and drops somewhat, correspondingly opening the valve 31 and increasing the flow of gas through the apparatus. The pressure of gas in the outlet 22, and hence the pressure on the consumer's burners, is thus maintained constant within narrow limits.

The plate 78 on diaphragm 48 is so chosen that the pressure differential on its opposite side, due to the drop through the volumetric measuring mechanism 12 and orifice 39 cannot lift the plate and diaphragm until the flow reaches the demand limit. The demand limiting valve 33 is therefore held wide open and does not affect the pressure of gas at the outlet 22 so long as the gas flow is below said limit. If, however, the rate of flow of gas to the consumer's burners reaches the demand limit, the drop in pressure through the metering mechanism 12 and the orifice 39 becomes sufficient to lift the plate 78 and move valve 33 towards its seat 32. So long then as the high rate of flow through the apparatus continues, the valve 33 is controlled by the diaphragm 48 to maintain a constant pressure drop through the mechanism 12 and orifice 39 and the consumer is able to obtain only the amount of gas determined by the demand limit assigned to the particular installation by the choice of the size of orifice 39. As soon as the demand limiting valve 33 comes into action, it produces an additional drop in pressure in the gas at the outlet 22, thus warning the user that the demand limit has been exceeded. The valve 31 and diaphragm 46 are disabled by the coming into action of valve 33 and diaphragm 48, and have little effect until normal conditions have been restored by the shutting off of one or more burners.

I find that by using the two valves in series as described above the pressure at the outlet varies only slightly when the flow varies from the minimum to that at which the demand limiting valve operates. Moreover the gas is always metered at the pressures so close to the standard that there is no appreciable error in the meter reading. Thus, when the gas flow is a minimum, the pressure drop through the dry meter and the orifice is very small and the pressure at the intake of the meter is substantially the same as that at the outlet. At the demand limit, however, the pressure at the outlet is still that fixed by valve 31 and the drop through the measuring mechanism 12 and orifice 39 is small, so that the gas is always metered within a small differential of that at which the meter is calibrated.

According to my invention, moreover, the operating conditions on the diaphragm 48 and valve 33 are such that there is no tendency for the valve to be carried into actual contact with the seat 32. Hence there is no opportunity under ordinary conditions for valve 33 to stick, a matter which has caused great difficulty to consumers when using demand limiting valves in coal gas systems. That this is the case will be clear from the description of the operation of diaphragm 48 and valve 33 as follows:

Before the demand limiting valve 33 comes into play the pressure at the outlet is that set by the pressure controlling valve 31. If now the rate of use of the gas passes the demand limit, the drop in gas pressure through the mechanism 12 and orifice 39 becomes sufficient to create a difference between the pressure of gas in chamber 28 and that in chamber 44 sufficient to lift diaphragm 48 and its connected parts, and valve 33 begins to close, thereby reducing the flow to chamber 28 and decreasing the gas pressure in chamber 28. The pressure differential operating on diaphragm 48 is thus decreased and the valve 33 moves toward its seat only so far as is necessary to reduce the flow to the point that the pressure differential on diaphragm 48 just balances the weight of diaphragm 48 and connected parts. The valve 33 thus operates to maintain a substantially constant pressure differential on diaphragm 48, thus ensuring a flow through the orifice of not more than the predetermined demand limit. While there is ordinarily no tendency for valve 33 to close tight, sudden abnormal pressure variations might throw the valve against its seat and cause it to stick. I have illustrated a stop 80 adapted to prevent the valve 33 approaching closer to its seat than necessary to reduce the flow of gas to the demand limit. The same effect may be obtained in the absence of a stop by adjusting the connections between diaphragm 48 and valve 33. A matter of adjustment being difficult to illustrate, however, it has not been attempted to do so. According to my invention, moreover, the weight 78 on diaphragm 48 tends to open valve 33 and as soon as the demand for gas drops below that limit set by the given installation, valve 33 is thrown wide open again.

In particular, it should be understood that while the arrangement of valves and operating diaphragms herein disclosed is especially well adapted to be operated in part at least by the drop across a volumetric metering mechanism, it can be used to advantage also where the entire drop in pressure for operating the demand limiting valve is caused by an orifice or its equivalent. Also several features of the apparatus herein described are described and claimed in my prior application Serial No. 651,483, filed July 12, 1923, and are accordingly not claimed herein.

While I have illustrated and described in detail the embodiment of my invention now preferred by me, I do not intend to limit myself to the details herein disclosed except in so far as such details are clearly expressed in the claims.

Having thus described my invention, I claim—

1. The combination of a casing having an inlet and outlet, a volumetric metering mechanism in said casing, means in said casing for normally maintaining constant gas pressure in said outlet, and demand limiting means also in said casing operating independently of said means and controlled at least in part by the drop in pressure across said volumetric mechanism.

2. The combination of a casing having an inlet and outlet, volumetric metering mechanism in said casing, means for normally maintaining constant gas pressure in said outlet, means for causing a pressure drop between said inlet and outlet in addition to that across said mechanism, a demand limiting means operating independently of said constant pressure means and controlled by the drop in pressure across both said volumetric mechanism and said last mentioned means.

3. The combination of a volumetric metering mechanism, a pair of valves through which gas passes prior to said mechanism, a diaphragm having fixed pressure on one side and pressure gas from the outlet side of said mechanism on its other side, operating connections between said diaphragm and that one of said valves through which the gas first passes, a second diaphragm, said second diaphragm having pressure gas on one side from the outlet side of said mechanism and pressure gas on its other side from the space at the intake of said mechanism, and operating connections between said second diaphragm and the other of said valves.

4. The combination of a volumetric metering mechanism, a pair of valves through which the gas passes prior to said mechanism, a pair of spaced diaphragms, means for leading gas from the outlet side of said mechanism to the space between said diaphragms, one of said diaphragms being exposed to the atmosphere and the other to the pressure of the gas immediately after passing said valves, connections whereby the diaphragm exposed to the atmosphere controls that one of said valves through which the gas first passes, and connections whereby the other diaphragm controls the other valve.

5. The combination of a volumetric metering mechanism, demand limiting and pressure regulating valves through which the gas passes in series with said mechanism, means for causing a pressure drop in the gas in addition to that caused by said mechanism, a pair of spaced diaphragms, means for leading the gas from the outlet side of said mechanism and said means to the space between said diaphragms, one of said diaphragms being exposed to a fixed pressure and the other to the pressure of the gas at the intake of said mechanism, connections whereby the diaphragm exposed to said fixed pressure controls said pressure regulating valve, and connections whereby the other diaphragm controls the other valve.

6. The combination of a volumetric metering mechanism, pressure regulating and demand limiting valves through which the gas passes in series with said mechanism, a chamber whose walls are formed in part by two spaced diaphragms, means for leading gas from the outlet side of said mechanism to said chamber, one of said diaphragms being exposed to a fixed pressure and the other to the pressure of the gas at the intake of said mechanism, connections passing through the wall of said chamber whereby the one of said diaphragms exposed to said fixed pressure controls said pressure regulating valve, and connections whereby the other diaphragm controls the other valve.

7. The commbination of a volumetric metering mechanism, a chamber through which the gas passes to said mechanism, a pair of valves controlling the flow of gas to said chamber, means in series with said mechanism for increasing the pressure drop, a second chamber partially enclosed by a pair of spaced diaphragms, one of said diaphragms being exposed to the atmosphere and the other to the gas pressure in said first mentioned chamber, means maintaining the gas pressure in said second mentioned chamber equal to that on the outlet side of said mechanism and said means, and connections whereby said valves are controlled by said diaphragms.

8. The combination of means for causing a drop in pressure in a stream of flowing gas, a chamber defined in part by a pair of spaced diaphragms one of which has one side exposed to a fixed pressure, means for leading gas from the low pressure side of said means to the said chamber, the other of said diaphragms having one face exposed to the gas pressure on the high pressure side of said first mentioned means, and a pair of valves controlled one by each of said diaphragms, said valves controlling the pressure of gas in series with said first means.

9. The combination of means for causing a drop in pressure in a stream of flowing gas, a chamber defined in part by a pair of spaced diaphragms one of which has one side exposed to the atmosphere, means for leading gas from the low pressure side of said means to said chamber, the other of said diaphragms having one face exposed to the gas pressure on the high pressure side of said drop producing means, a pair of valves controlled one by each of said diaphragms, said valves controlling the passage of gas in series with said first means, and means whereby said second mentioned diaphragm is prevented from completely closing the valve controlled by it.

10. The combination of means for causing a drop in pressure in a stream of flowing gas, a chamber defined in part by a pair of spaced diaphragms one of which has one side exposed to a fixed pressure, means for leading gas from the low pressure side of said means to said chamber, the other of said diaphragms having one face exposed to the gas pressure on the high pressure side of said first mentioned means, a pair of valves controlled one by each of said diaphragms, said valves controlling the passage of gas in series with said means, said diaphragms being weighted, and connections between said diaphragms and said valves whereby the weights of the diaphragms tend to open said valves.

11. The combination of means for causing a drop in pressure in a stream of flowing gas, a chamber defined in part by a pair of spaced diaphragms one of which has one side exposed to a fixed pressure, means for leading gas from the low pressure side of said means to said chamber, the other of said diaphragms having one face exposed to the gas pressure on the high pressure side of said first mentioned means, a pair of valves controlled one by each of said diaphragms, said valves controlling the passage of gas in series with said means, said diaphragms being weighted, connections between said diaphragms and said valves whereby the weights of the diaphragms tend to open said valves, and means associated with the second one of said valves in the direction of gas flow preventing the complete closing of the valve.

12. The combination of a gas conduit, a pair of valves for governing the flow of gas through said conduit, diaphragms and means associated therewith for controlling said valves, the diaphragm controlling the one of said valves through which the gas first passes being exposed on one side to a fixed pressure and on its other side to the pressure of gas after it has passed said first valve, and means through which the gas flows in series with said valves and for creating a drop in the gas pressure, the one of said diaphragms controlling the other of said valves being exposed on one side to the gas pressure on the outlet side of said drop producing means.

13. The combination of a gas conduit, a pair of valves for governing the flow of gas through said conduit, diaphragms and means connected thereto for controlling said valves, the diaphragm controlling the one of said valves through which the gas first passes being exposed on one side to a fixed pressure and on its other side to the pressure of gas after it has passed said first valve, means through which the gas flows in series with said valves and for creating a drop in the gas pressure, the one of said diaphragms controlling the other of said valves being exposed on one side to the gas pressure on the outlet side of said drop producing means, said diaphragms being weighted and the weights of said diaphragms tending to open said valves.

14. The combination of a gas conduit, a pair of valves for governing the flow of gas through said conduit, diaphragms controlling said valves, the diaphragm controlling the one of said valves through which the gas first passes being exposed on one side to a fixed pressure and on its other side to the pressure of gas after it has passed said first valve, means for creating a drop in the gas pressure, the one of said diaphragms controlling the other of said valves being exposed on one side to the gas pressure on the outlet side of said drop producing means, said diaphragms being weighted and the weights of said diaphragms tending to open said valves, connections between said diaphragms and said valves, and means associated with the second of said valves in the direction of gas flow preventing the complete closing of the valve.

15. A combined pressure regulator and volume meter comprising in combination a pressure regulating valve, a volume meter in series with said valve and following the same in the course of the gas flow, a diaphragm and means connected thereto for operating said valve, means whereby a substantially constant pressure is maintained against one side of said diaphragm and means for applying the pressure of the gas at the outlet side of said volume meter to the other side of said diaphragm for controlling the operation of said valve and for maintaining a substantially constant pressure at the outlet side of the meter.

In testimony whereof I affix my signature.

ROBERT G. GRISWOLD.